United States Patent

[11] 3,580,093

| [72] | Inventor | Kazuhiro Tomizawa<br>Tokyo, Japan |
|---|---|---|
| [21] | Appl. No. | 805,395 |
| [22] | Filed | Mar. 10, 1969 |
| [45] | Patented | May 25, 1971 |
| [73] | Assignee | Nittai Lease Company, Ltd.<br>Tokyo, Japan |

[54] LOWER ROLLER FOR ENDLESS TREAD FOR VEHICLE
1 Claim, 2 Drawing Figs.

[52] U.S. Cl. ..................................................... 74/230.3,
74/230.5, 152/50, 295/11
[51] Int. Cl. ...................................................... B62d 55/14

[50] Field of Search........................................... 152/47, 50,
48; 295/7, 8.5, 11; 305/24, 25, 28, 56; 74/230.7,
230.5, 230.01, 230.05, 230.3; 64/27 (R)

[56] References Cited
UNITED STATES PATENTS

| 637,684 | 11/1899 | Turowski........................ | 295/11 |
| 1,250,158 | 12/1917 | Frommann................... | 152/50 |
| 1,503,844 | 8/1924 | Moody........................... | 295/11 |

*Primary Examiner*—Richard J. Johnson
*Attorney*—Davis, Hoxie, Faithfull and Hapgood

ABSTRACT: A lower roller for the endless treads of various vehicles, particularly to a lower roller comprising a hub, elastic element provided between tire flanges and metal ring provided around said elastic element.

PATENTED MAY 25 1971    3,580,093

LOWER ROLLER FOR ENDLESS TREAD FOR VEHICLE

This invention relates to a lower roller for the endless treads of various vehicles, particularly to a lower roller comprising a hub, a tire on said hub, elastic element provided between tire flanges and metal ring provided around said elastic element.

Heretofore, as shown in FIG. 1 every lower roller A on an endless tread 14 for vehicles is frequently affected by impulsive force of heavy load under severe road condition.

Since a conventional lower roller has no shock absorbing element between the rollers and tread links, many disadvantages such as vibration due to the shocks cannot be avoided, noise cannot be reduced, and the roller is easily broken by frictional abrasion. Aims of the present invention are to overcome these defects.

Figure 1:
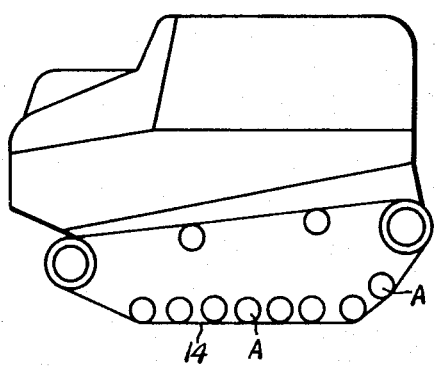
FIG. 1 is a schematic side view of a vehicle having endless treads on both sides thereof.
Figure 2:
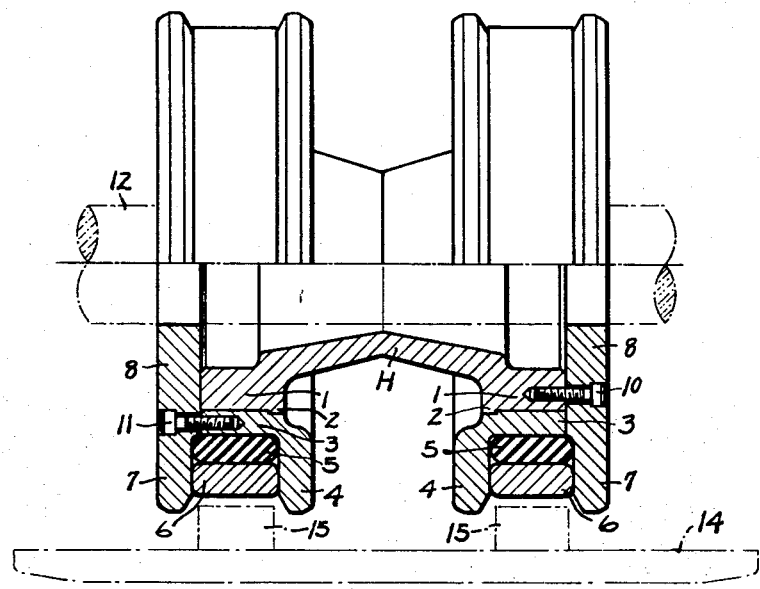
FIG. 2 is an enlarged front view of one of lower rollers for the endless tread, lower part thereof being in section.

As shown FIG. 2, on both ends of the roller hub H, its outer periphery is gradually widened to the hub ends 1. On the each inside of the hub ends peripheries, rim 2 is provided therearound and a tire 3 having inside flange 4 is fitted to the hub end 1. Around the tire 3 a ring 5 of hard elastic material such as rubber or synthetic resin is provided and a metal ring 6 is placed around the elastic ring 5. On the outer side of the hub 1, tire 3, rubber ring 5, and metal ring 6, an end plate 8 with outer flange 7 on its periphery is secured by the bolts 10 to the hub end 1 to fasten the tire 3 rigidly to the rim 2 and to allow the metal ring 6 to be radially slidable between the flanges 4 and 7. The numbers 12, 14 and 15 designate a shaft which bears the roller, a tread plate and its link respectively.

When the endless tread of the vehicle is operated, the metal ring 6 engages and rolls on the successive links 15 on each tread plate 14. The metal ring 6 is shifted vertically centerward to compress said rubber ring 5 to absorb shocks. As the metal ring 6 is merely shifted centerward sliding on the opposite sides of the flanges 4 and 7, the rubber ring 5 is elastically deformed by the pressure but is confined by the flanges and so cannot to be squeezed out from the clearance between the metal ring 6 and the flanges 4 and 7.

When the metal ring 6 engages the link 15 of the tread plate 14, though the metal ring 6 is pressed up by the shocking load, the shock, vibration and noise are reduced by the elastic deformation of interposed rubber ring, and wear and tear of the metal ring are reduced and durability of the tread and rollers is improved.

Another advantage is that when the bolts are unscrewed to get out the end plate 8, the rubber ring 5 and metal ring 6 may be easily exchanged with new parts.

I claim:

1. A lower roller for an endless tread for vehicles comprising a hub member for support on a shaft, the hub including axially spaced tire mounting portions, each mounting portion including a radially extending end face and an annular tire mounting surface supporting a metal tire on each mounting portion, the tires each including an integral radially extending annular flange and a cylindrical portion coaxial with and telescoped over the hub member mounting portion and extending axially outwardly from said flange, a pair of end plates bolted to the end faces of the hub and extending radially to form a second flange axially outwardly spaced from the tire flanges by the longitudinal extent of the cylindrical portion of the tires, an elastic ring extending between each pair of flanges, confined thereby, and overlying the cylindrical portions of the tires, and a metal ring overlying and supported by the elastic ring and extending between each pair of flanges, each of said flanges extending radially beyond said ring.